(12) United States Patent  (10) Patent No.: US 8,072,317 B2
Sproelich et al.  (45) Date of Patent: Dec. 6, 2011

(54) HAPTIC SOLENOID SYSTEM

(75) Inventors: Aparna Mishra Sproelich, Cary, NC (US); David Rawls, Cary, NC (US); Doug Hilliard, Cary, NC (US)

(73) Assignee: Johnson Electric S.A., La Chaux-de-Fonds (CH)

( * ) Notice: Subject to any disclaimer, the term of this patent is extended or adjusted under 35 U.S.C. 154(b) by 341 days.

(21) Appl. No.: 12/390,769

(22) Filed: Feb. 23, 2009

(65) Prior Publication Data

US 2010/0013614 A1   Jan. 21, 2010

Related U.S. Application Data

(60) Provisional application No. 61/081,227, filed on Jul. 16, 2008, provisional application No. 61/085,182, filed on Jul. 31, 2008.

(51) Int. Cl.
 *G08B 6/00* (2006.01)
(52) U.S. Cl. .................. 340/407.2; 340/407.1; 340/7.6; 345/173; 310/12.26
(58) Field of Classification Search .............. 340/407.1, 340/407.2, 7.6, 323 R; 345/156–158, 173, 345/161, 169, 179, 184; 463/30, 36–38; 715/701, 702; 434/45; 244/221, 223; 310/12.26
See application file for complete search history.

(56) References Cited

U.S. PATENT DOCUMENTS

| | | | | |
|---|---|---|---|---|
| 6,203,076 B1 * | 3/2001 | Wytcherley et al. | .......... | 292/202 |
| 6,982,630 B2 * | 1/2006 | Beckwith et al. | .......... | 340/407.1 |
| 7,148,875 B2 * | 12/2006 | Rosenberg et al. | .......... | 345/156 |
| 7,825,903 B2 * | 11/2010 | Anastas et al. | ................ | 345/173 |

* cited by examiner

*Primary Examiner* — Anh V La
(74) *Attorney, Agent, or Firm* — Martin Fleit; Paul D. Bianco; Fleit Gibbons Gutman Bongini & Bianco, PL

(57) ABSTRACT

A supporting surface and a touch screen member mounted to a plastic frame having a first vibration transmitting slot and at least two mounting slots. A pair of similar L-shaped poles is mounted in the frame in juxtaposition to define gaps between them. One of the poles constitutes a stationary pole and the other of the poles constitutes a movable pole. A winding is mounted on the stationary pole. The frame defines a vibration transmitting slot, and the touch screen member is attached to the frame by a tab that is press fitted into the vibration transmitting slot so that vibrations created by the movable pole can be transmitted via the vibration transmitting slot to the touch screen member. The additional slots defined by the frame and tabs defined by the supporting surface mutually coact for mounting the frame to the supporting member in a stationary position.

18 Claims, 7 Drawing Sheets

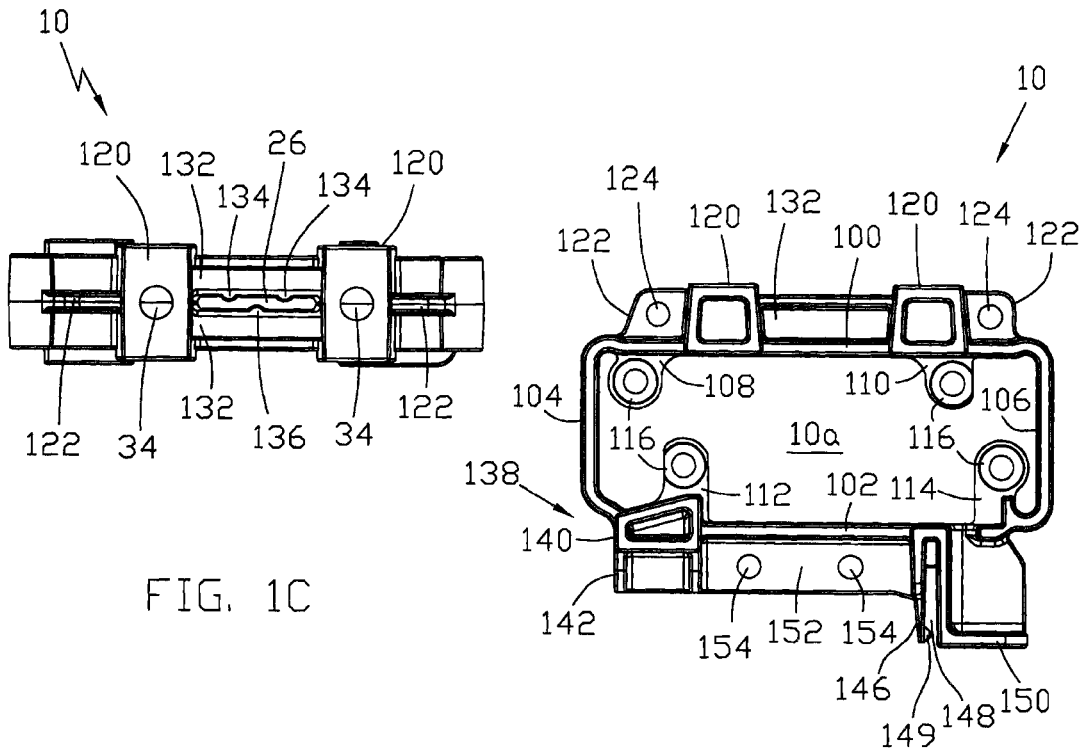
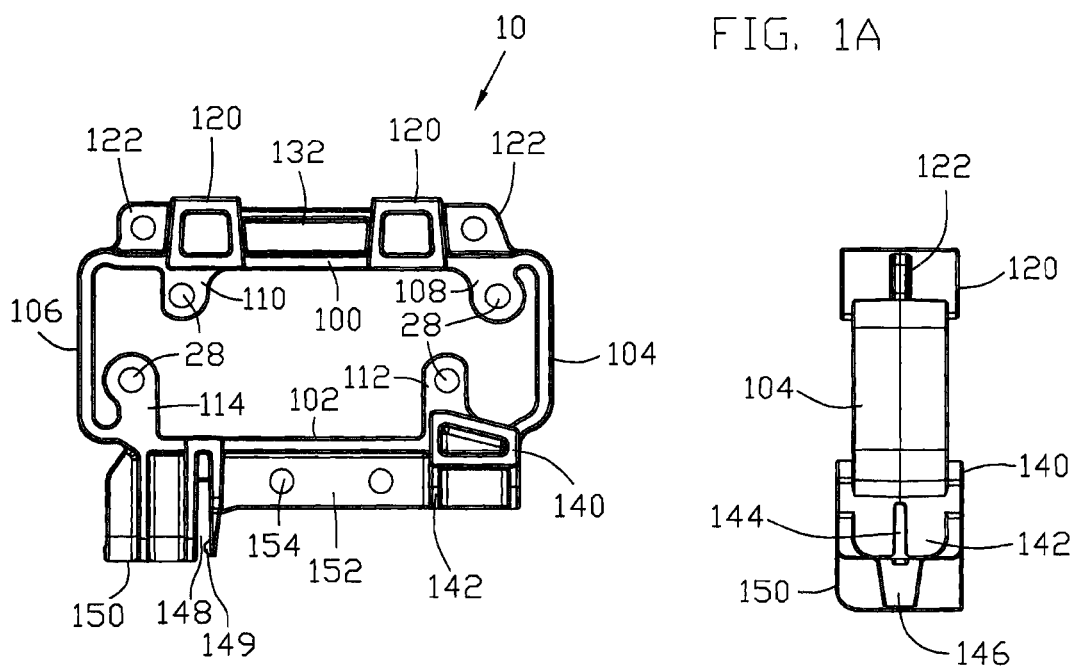

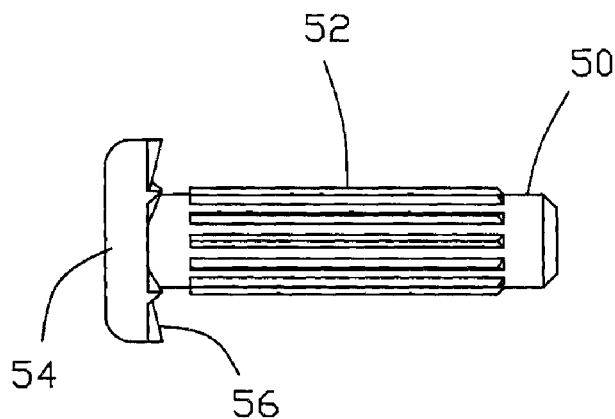
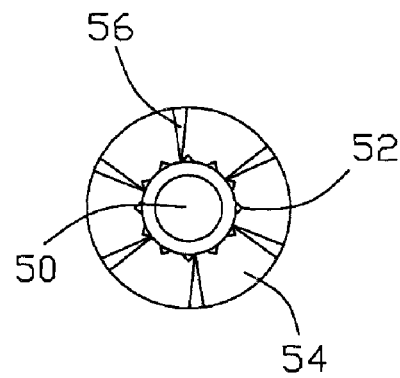
FIG. 11    FIG. 12
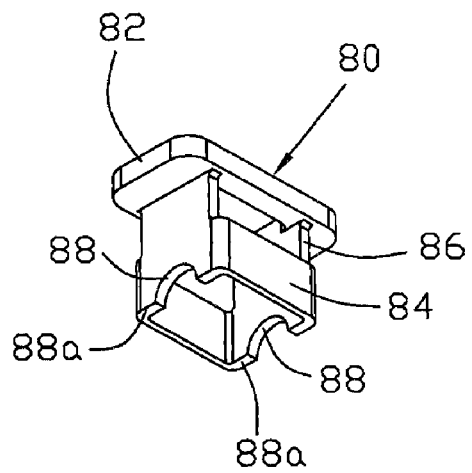
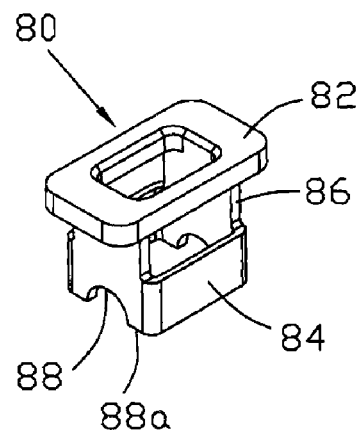
FIG. 13    FIG. 14

HAPTIC SOLENOID SYSTEM

BACKGROUND OF THE INVENTION

1. Field of the Invention

This present invention relates to a haptic solenoid and a haptic solenoid system to provide touch/sensory feedback to a user when a virtual button is depressed on a monitor or display screen, and more particularly, to a haptic solenoid system in an automobile environment.

2. Prior Art

Existing products for touch sense mainly available on the market include small motor devices that are used in cell phones and electronics/video games. Nothing is currently available or used in the automotive market. The main problem with existing products is that none are available or adapted for automotive markets. Also, haptic solenoids are known, but a problem with known designs is that during the short bursts of vibrational energy/motion, an audible clicking noise may be heard. Whereas in a noisy installation this would not be a problem, in an automobile this noise is undesirable as it can interfere with user chosen electronic sounds.

SUMMARY OF THE INVENTION

The main object of the present invention is to provide a haptic solenoid and a haptic solenoid system particularly adapted for automotive use for providing touch/sensory feedback to a user when a virtual button is depressed on a monitor or display screen mounted in an automobile. This feedback combined with software technology will allow automotive manufacturers to eliminate push buttons on the dashboard and thus save cost. This invention covers a novel haptic solenoid and system combinations including the haptic solenoid, but not the software technology that drives it. The main advantages for the haptic solenoid of the present invention lie in the unique design of the frame for the haptic solenoid, which enables efficient operation and quick and cost effective installation to a base support and to a touch screen.

The present invention utilizes a novel haptic solenoid that works on the solenoid principle, but is unique in design and construction in that it uses a monolithic frame in the shape of a hollow quadrilateral that includes mountings for identical pole pieces, one as a stator and one as an armature (plunger), a screen mount and a base mount for fixing the frame to a stationary structure. The pole pieces are mounted on strategically placed pole support pads or tabs that are an integral part of the frame and that project slightly into the central hollow area of the frame. The plastic frame serves as the resilient restoring force for the solenoid. Powering the unit on and off alternately closes and opens the air gap between the two pole pieces. This limited motion produces a vibration pulse with each power cycle; by cycling power at different frequencies, different vibrations are generated, which are transferred in a unique way by the integral screen mount of the plastic frame to a touch screen. These vibrations are felt by a user when the touch screen is pressed gently. The lower part of the solenoid moves very little, and is rigidly mounted in a unique way via press fit tabs to a stationary structure, such as, a sheet metal case and/or enclosure, or an object to be vibrated that holds the electronics of the overall system incorporating the touch screen.

The haptic solenoid can be mounted on any supporting structure in the manner noted above. The top of the solenoid moves and the plastic frame on which the parts of the solenoid are mounted provides the spring action to return the pole mounted in the top portion of the solenoid back to its original position. The top portion of the plastic frame is coupled to the touch screen or any object that one wishes to vibrate in a unique and novel manner by the integral screen mount. During operation, the vibration induced by the poles of the solenoid is transferred by the plastic frame to the touch screen frame causing its vibration. The solenoid can be mounted in front facing or rear facing to the mounting surface. This haptic solenoid is specifically designed to be installed on the frame of the sheet metal casing of the media electronics upon which the touch screen is also mounted.

As will be appreciated from the foregoing, the purpose of the present invention is to produce short bursts of vibrational energy/motion that can be sensed by tactile feel.

The principal uses of the invention include tactile feedback actuation for touch screens in place of physical selector buttons in vehicles, tactile actuation in a seat or chair in an automobile to improve alertness/safety, and other like applications.

The haptic solenoid can be used without any noise suppression of the plunger movement, if the haptic solenoid is being used in a noisy environment. However, for a quiet environment, such as, an automobile, it is important that noise be suppressed. This is accomplished through the use of a bumper on one or both poles of the solenoid. The bumper can be a simple narrow annular resilient bumper, a bumper with skirt design to allow more surface area of the pole to be protected with acoustic dampening material or preferably a bumper of skirt design with novel cutouts. Additionally, the poles can be provided with notches to hold the bumpers in position and prevent any movement of the bumpers during use. Preferably the bumper attachment notches in the poles are located out of the direct path of the field to not adversely affect the acceleration. Also, bumpers with skirts can be designed with thinner skirt material between adjacent pole portions so that an optimum gap (spacing) between the poles can be maintained.

Other and further objects of the invention will become apparent from the following detailed description of preferred embodiments of the invention when taken in conjunction with the appended drawings.

BRIEF DESCRIPTION OF THE DRAWINGS

FIG. 1A is a front view in elevation showing the frame of the solenoid.

FIG. 1B is a back view of the frame shown in FIG. 1A.

FIG. 1C is a top view of the frame shown in FIG. 1A.

FIG. 1D is a left side view of the frame shown in FIG. 1A.

FIG. 11 is the side view of a novel knurl pin.

FIG. 12 is an end view of the novel knurl pin shown in FIG. 11.

FIG. 13 is a perspective view, looking up, of an improved skirt bumper having cutouts used for noise suppression for the novel haptic solenoid.

FIG. 14 is a perspective view, looking down, of the improved skirt bumper of FIG. 13.

DETAILED DESCRIPTION OF PREFERRED EMBODIMENTS OF THE INVENTION

The novel haptic solenoid device works on the solenoid principle, but is unique in that it uses a novel frame for mounting identical pole pieces: one as a stator and one as an armature (plunger). Powering the unit on and off alternately closes and opens the air gap between the two pole pieces. This limited motion produces a vibration pulse with each power cycle; by cycling power at different frequencies, different vibrations are generated. These vibrations are felt by the operator when they press a touch screen for instance. The lower part of the solenoid moves very little, and is rigidly mounted to a sheet metal case that holds the electronics of the system. The top portion of the solenoid moves and provides the spring action to return the moving pole back to its original position during operation, and will move or drive a touch screen frame via a novel screen mount as an integral part of the frame. The solenoid can be mounted in front facing or rear facing to its mounting surface. The haptic solenoid is specifically designed to be installed on the frame of the sheet metal casing of associated media electronics.

The purpose of the invention is for the apparatus to give short bursts of vibrational energy/motion that can be observed by tactile feel. Potential uses include tactile feedback actuation for touch screens in place of physical selector buttons in vehicles, tactile actuation in a seat or chair to improve alertness/safety.

Figure 1:
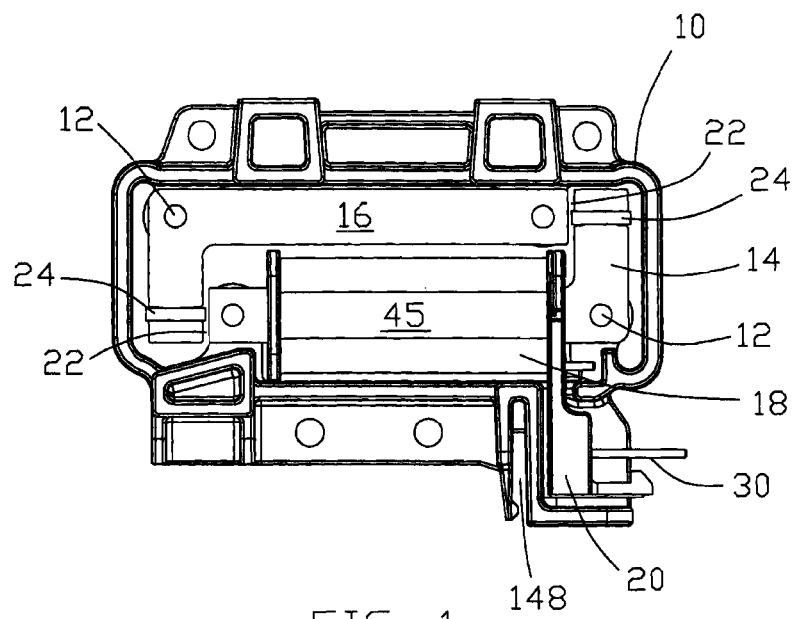
FIG. 1 is a front view of the novel haptic solenoid of the present invention using a simple, narrow, annular, square in cross section, resilient bumper.
Figure 2:
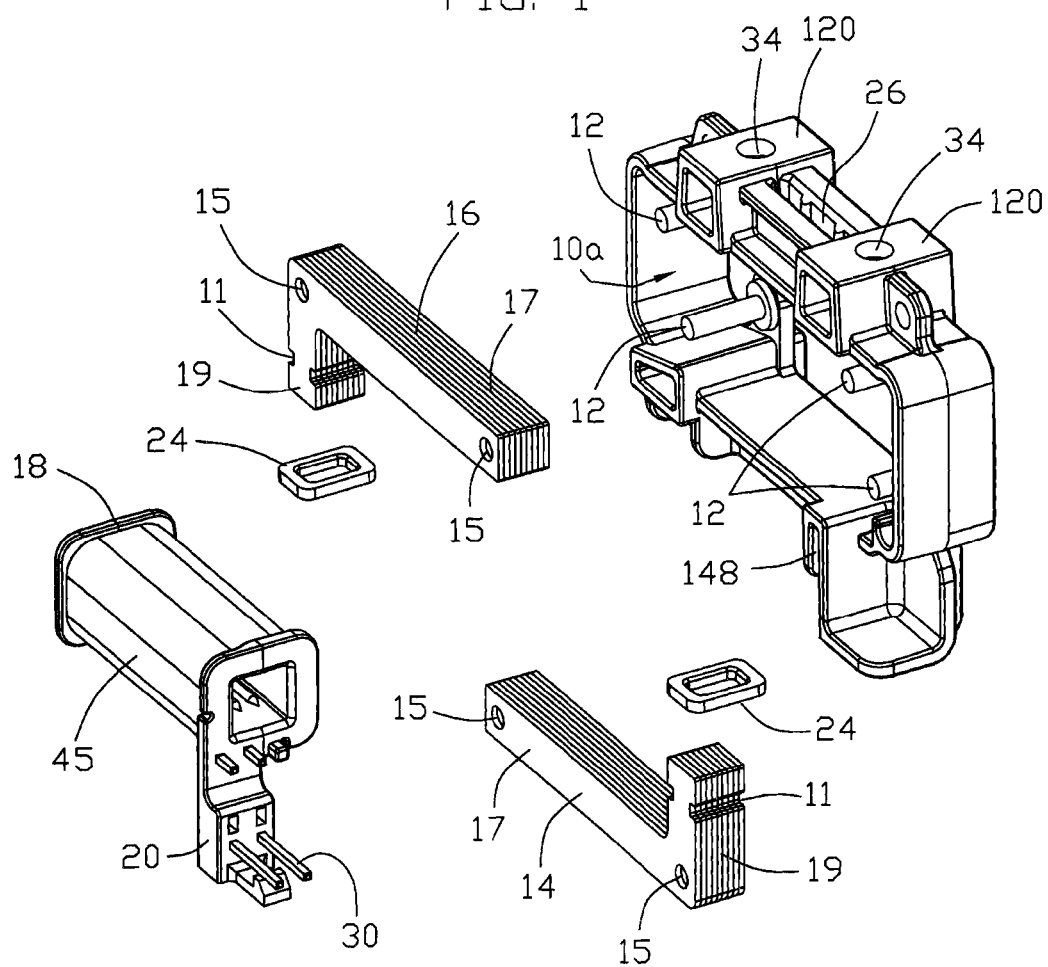
FIG. 2 is an exploded view of the novel haptic solenoid shown in FIG. 1.

Referring now to the drawings, FIGS. 1 and 2 shows a first embodiment of the novel haptic solenoid. The solenoid consists of a quadrilateral plastic frame 10, rectangular in longitudinal cross section that is hollow or has a central through opening or open area 10a. Poles 14 and 16 and all other components are secured to frame 10, which provides return flex to create the vibration feel. Frame 10 is mounted on a supporting plate, as will be explained in detail hereinafter, and remains in a stationary orientation, and its top portion will flex, as also shall be described in detail hereinafter.

Referring now to FIGS. 1A to D, the frame 10 will now be described in more detail. FIG. 1A shows frame 10 in front elevation. The use of "front", "back", "upper", "lower", "left", "right", etc is simply for reference and convenience in describing the frame 10 and not in any way for limitation. Frame 10 can assume any orientation relative to its contacting structure depending on how it is mounted to its supporting base or plate and touch screen. As noted, frame 10 has a quadrilateral shape with a central through opening or open area 10a. The frame 10 is rectangular in longitudinal cross section. The frame 10 in transverse cross section is band-like, that is substantially wider than thick. The frame 10 consists of opposed upper long leg 100 and lower long leg 102, and opposed left and right short side legs 104 and 106. Projecting from long legs 100 and 102, on the back side of the frame 10 with minimal intrusion into the open area 10a, are tabs 108, 110, 112, and 114 that cantilever upward or downward on the back side of the frame. At the free end of each tab 108-114 is a pole support boss 116 facing toward the front of the frame 10.

There are two ways for mounting poles 14 and 16 in frame 10 in the open area 10a. A first way is to mold or form on bosses 116 integral posts 12 cantilevered toward the front of the frame, as shown in FIGS. 1 and 2. The second way, and the preferred way, is to mold or form bosses 116 with central through holes 28, as shown in FIGS. 3, 4, 5 and 6, and to use special pins 50, as shown in FIGS. 11 and 12, for mounting poles 14 and 16. A more detailed description regarding the two ways of mounting the poles 14 and 16 will follow regarding the descriptions of FIGS. 1 and 2 and FIGS. 3-6.

Frame 10 on its upper long leg 100 is molded or formed integrally with a superstructure consisting of a pair of spaced transversely extending box-like elements 120, each having a hole 34, a pair of reinforcing flanges 122 interconnecting the outer side of each element 120 to upper leg 100 or frame 10. Each flange 122 defines an opening 124. Extending between elements 120 is an integrally formed screen mount 130 consisting of a pair of opposed walls 132 fixed to elements 120 and upper leg 100 that define between them an elongated slot 26 that extends in the mid-plane of frame 10 toward open area 10a. Slot 26 is formed with two spaced ribs 134 in one wall and a rib 136 on the other wall located between ribs 134. The ribs 134 and 136 extend vertically and each projects into slot 26 to the longitudinal centerline of the slot 26.

Frame 10 on its lower leg 102 is provided with a substructure 138 that consists of (1) a transverse extending box-like element 140 that extends laterally outward of leg 102 front and back, and a first mounting portion 142 having a longitudinally extending, tapered slot 144 on its left side as viewed in FIG. 1A; (2) a second mounting portion 146 having a transversely extending, tapered slot 148 having an entry rib or dimple 149, and a platform portion 150 that is outwardly open longitudinally (to the right as viewed in FIG. 1A) for supporting a connector 20; and (3) a reinforcing flange or web 152 extending between (1) and (2) having a pair of holes 154.

Frame 10 is monolithic, that is formed or molded as a single integrated structure having the parts and portions as described above.

Referring now to FIG. 1 and the exploded view of FIG. 2 a first embodiment is shown. In this embodiment, frame 10 is molded integrally with four supports (posts) 12 extending normally from bosses 116 into open area 10a. The posts 12 serve as mountings for two identical L-shaped poles or pole pieces 14 and 16 of the solenoid juxtaposed in reverse and positioned in open area 10a. Each pole is composed of a stack of laminations and has two holes 15 for mounting the pole on two posts 12. The posts 12 are smaller in diameter than holes 15 to enable a mounting fixture to hold the poles 14 and 16 and adjust them relative to one another to obtain the correct juxtaposition to set appropriate gaps 22 between the poles to predetermined selected values.

The upper pole 16 is mounted on the upper posts 12, and the lower pole 14 is mounted on the lower posts 12. The fixture adjusts and then holds the poles, which are then heat staked to retain the poles in the appropriate fixed juxtaposition as shown in FIG. 1 to define therebetween working gaps 22.

During the heat staking, the melted plastic material of posts 12 flows into the holes 15 to fill the extra spaces to fix the poles in the desired positions.

Both poles 14 and 16 are L-shaped with a long leg 17 and a short leg 19. A plastic stator or bobbin 18 with an integrated connector 20, to eliminate the necessity of a "pig-tail" wire harness, is received onto the pole 14, which is the stationary pole, and fitted into a lower space portion of open area 10*a* defined by the frame 10. Connectors 30 are mounted to the connector 20 and extend outwardly to enable power to be connected to the solenoid.

Pole 16 is the movable or moving pole and when mounted onto its respective two posts 12, defines working gaps 22 between (1) long leg 17 of the stationary pole 14 and juxtaposed adjacent inner face of the short leg 19 of the other pole 16, and (2) short leg 19 of pole 14 and end face of long leg 17 of pole 16. Easy mount bumpers 24 are assembled into cutout notches 11 of the pole pieces 14 and 16. Bumpers 24 are narrow, annular simple square cross section band bumpers composed of any suitable resilient material that dampen the pole click noise. The notches 11 serve the purpose of maintaining the position of the bumpers 24 and to prevent the gaps between the poles from increasing or decreasing from the optimum gap and thus, adversely affecting the magnetic flux path and acceleration.

The two poles 14 and 16 are each composed of a plurality of pressed laminations, preferably nine in number, with each lamination being about 0.5 mm thick. Magnetic wire is wound onto the bobbin 18, and a tape 45 is wound around the bobbin 18 wire to protect it.

Figure 15:
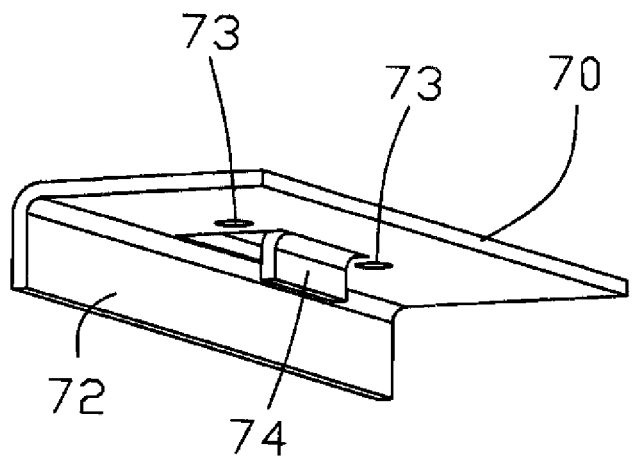
FIG. 15 is a perspective view of the screen frame that is coupled to the haptic solenoid.

The frame 10 is profiled as shown in the FIGS. 1 and 2. As described, at the top of the frame a top-opening, tapered, ribbed slot or pocket 26 is defined or formed. The two mounting locations 120 with holes 34 are located on opposite sides of slot 26. The purpose of the slot 26 and holes 34 is to connect a touch screen frame to the solenoid so that the vibrations generated in frame 10, due to the action of the solenoid, are transmitted directly to the connected touch screen frame, as will hereinafter be explained in greater detail with respect to FIGS. 5 to 10. As noted, the top of the frame 10 has two attachment holes 34 for the purpose of attaching a touch screen frame also provided with a pair of registering holes 73 (see FIG. 15). To this end, plastic pine-tree push-in fasteners 38 are used to effect the connection (illustrated in FIG. 5) in a simple and quick manner. This type of compliant fastener is used commonly in automotive assembly and eliminates the need to use screws.

The bottom of the frame 10 defines orientation mounting slots 144 (illustrated in FIG. 5) and 148 opening normal to each other, which serve the purpose of positively assembling and fixing the novel haptic solenoid apparatus to a supporting plate 60 without the necessity to use any attachment element such as screws, as will be explained in more detail hereinafter.

From the foregoing it is apparent that the frame 10 secures all components and provides return flex to create the vibration feel. The two poles 14 and 16 complete the required magnetic circuit. The bobbin 18 containing the magnet wire provides the generated flux and is mounted on pole 14, which passes thru it. The wound magnetic wire, when energized, generates flux that creates the magnetic field that draws pole 16 to pole 14 across the gaps 22 between the poles, causing the $1^{st}$ vibration pulse. When the solenoid is de-energized, the frame springs back to its original state, thus imparting the $2^{nd}$ vibration pulse. The bumpers 24, which occupy from 40 to 70% of the clearance gaps 22, serve the function of noise suppression. The design of the novel haptic solenoid using bumpers 24 provides a compact size for tactile vibration delivered of, e.g., 8 gs. The bumper design is unique in that its shape conforms to the shape of the pole and has minimal compression to not arrest the pole motion early. Thus, the apparatus is characterized by low audible noise.

The novel haptic solenoid apparatus works on the solenoid principle, but is unique in that it uses a novel monolithic plastic frame for mounting identical pole pieces: one as a stator and one as an armature (plunger). Powering the unit on and off alternately closes and opens the air gaps 22 between the two pole pieces 14 and 16. This limited motion produces a vibration pulse with each power cycle; by cycling power at different frequencies, different vibrations are generated. These vibrations are felt by an operator when he/she presses a touch screen mounted on the solenoid. The lower portion of the solenoid is fixed or rigidly mounted to a sheet metal case that holds the electronics of the system. This will be described in more detail hereinafter. The top portion of the solenoid moves and provides the spring action to return the moving pole 16 (plunger) back to its original or repose position during operation, and will impart the vibratory movement to the touch screen frame via the mounting slot 26. The solenoid can be mounted in front facing or rear facing to the mounting surface. The haptic solenoid apparatus of the present invention is specifically designed to be installed on the frame of the sheet metal casing of the media electronics. However, other mounting arrangements are possible.

The haptic solenoid system can give short bursts of vibrational energy/motion that can be observed or sensed by tactile feel. Potential uses include tactile feedback actuation for touch screens in place of physical selector buttons in vehicles, and tactile actuation in a seat or chair to improve alertness/safety, and other applications.

One of the significant features of the present invention is the use of vibration transmission pocket or slot 26. Rather than having screws that fasten the touch screen to the solenoid apparatus, the touch screen frame is attached to the solenoid using push-in fasteners that do not apply a torque (radial force vector) to the solenoid, while the vibration transmission path is accomplished using a sheet metal tab protruding from the touch screen frame press fitted directly into the receptacle pocket (slot 26) on the top of the solenoid frame 10, as will be described in more detail in the following.

In the first embodiment, pole retention on the frame 10 is by use of the heat-staked plastic posts 12 as described with respect to FIGS. 1 and 2. Alternatively, in place of the posts 12, and in a preferred second embodiment (see FIGS. 3 to 7), pole retention on frame 10 is accomplished using holes 28 in the bosses 116 of tabs 108-114 and pins 50. The holes 28 are larger in diameter than the knurl or splines 52 on pins 50 to enable the fixture that sets the poles 14 and 16 in position sufficient play. Knurl or splines 52 are slightly greater in diameter than holes 15 and are forced into holes 15 to securely hold the poles. When the poles are in the predetermined selected juxtaposition to provide the optimum gaps 22, the heads 54 of pins 50 are driven into the plastic of tabs 108-114 to set teeth 56 and thereby secure the poles 14 and 16 in correct position.

In this preferred embodiment, pole retention uses the radial and axial retention knurl pins 50, as illustrated in FIGS. 11 and 12, which show the design details of the preferred knurl pin 50. In this preferred embodiment only the four posts 12 are replaced by the four retention knurl pins 50. The air gaps 22 between the poles 14 and 16 are critical. In the first embodiment setting these air gaps is a challenge that is overcome by heat staked posts 12. The second embodiment yields an even better result using the special retention knurl pins 50. The knurl 52 on the pins 50 retains the poles in a radial direction or sense by mechanical interference of the knurls to the ID of the pole through holes 15, and the head 54 of the pin 50 applies an axial force using special barbs 56 to bite into the plastic frame 10 (pole support) to lock the poles 14 and 16 in position and securely maintain the gaps 22 between the poles 14 and 16 needed for the magnetic circuit to function properly.

As is evident from the above, an integrated spring is achieved by the inventive apparatus. The vibration output of the solenoid is caused by the magnetic circuit (poles) and the spring-back effect of the integrated spring due to the interaction of the top portion of the haptic solenoid frame 10 to the bottom portion of the frame. The material selected and the shape of the spring/frame work together to ensure proper function of the solenoid and that the desired vibration effect is felt.

Figure 3:
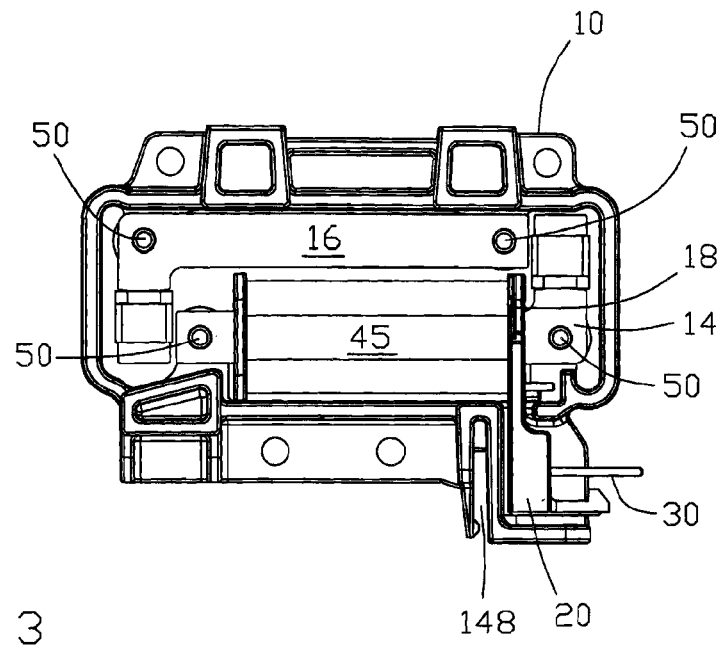
FIG. 3 is a front view of the novel haptic solenoid using an annular, square in cross section, resilient skirt bumper.
Figure 4:
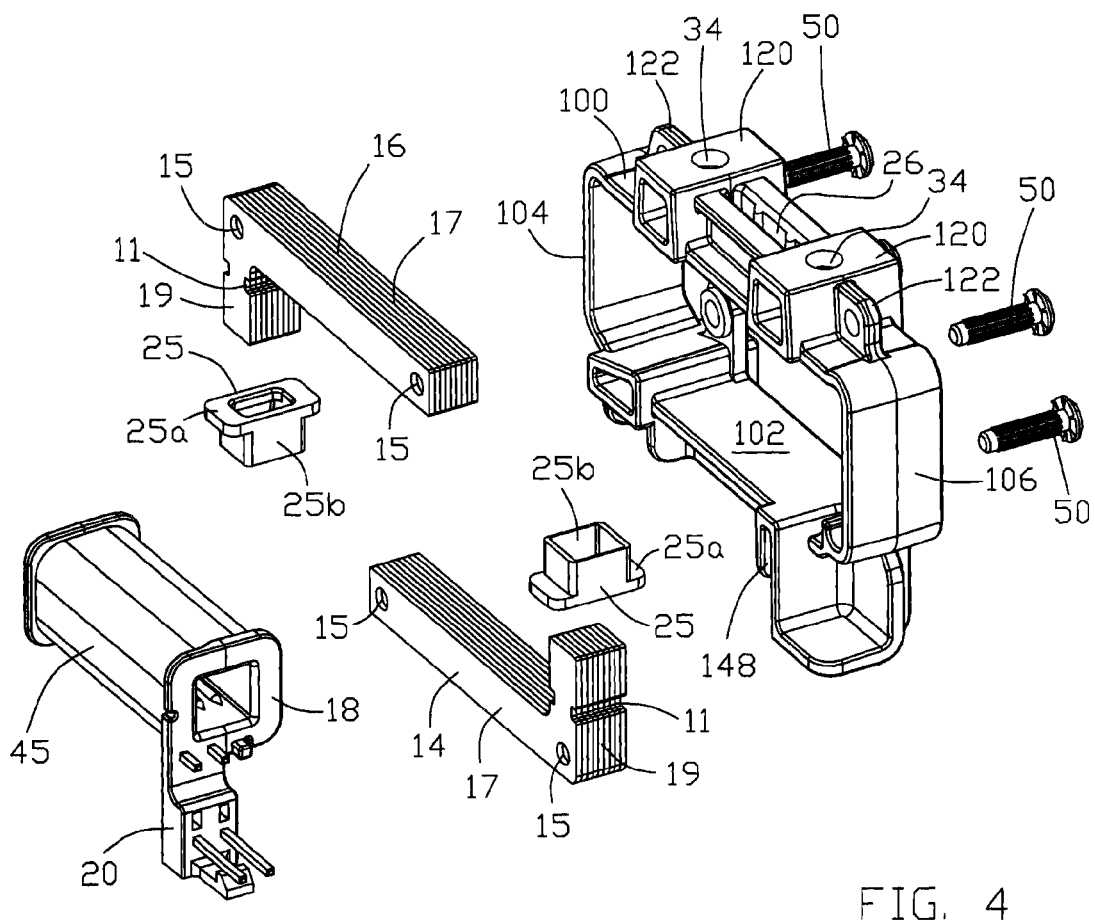
FIG. 4 is an exploded view of the novel haptic solenoid shown in FIG. 3.

Still referring to FIGS. 3 and 4, the haptic solenoid is shown with a skirt bumper 25. Same parts have been given the same reference numbers. As will be immediately evident, the structure of the haptic solenoid, except for the bumpers and use of pins 50 instead of posts 12 is the same. The bumpers 25 used in the assembly of FIGS. 3 and 4 are shown most clearly in the exploded view of FIG. 4. Bumper 25 is annular, square in cross section and made of a suitable resilient material and consists of a flat top 25a that extends outwardly on opposed sides that is integrated with a depending skirt 25b. The bumpers 25 are square in cross section to fit the poles 14 and 16, and the flat top 25a of each is positioned on the respective short leg 19 of the associated pole 14 or 16 in associated notch 11 that lies outside the associated gap 22 between the poles, and therefore, notches 11 retain the bumpers in a relatively fixed position so that the bumpers will not slide or shift out of place and the bumpers will not interfere with the solenoid action. At least the portion of the depending skirt 25b that is located in each gap 22 is of a preselected thickness, or more accurately, thinness, so that it serves its function without unduly influencing the critical gaps 22. The bumpers 25 with depending skirt 25b are assembled onto the poles into the cutout notches 11 of the pole pieces 14 and 16. Cutout notches 11 are now located outside the gaps 22. The bumper 25 with skirt 25b is unique in that its shape conforms to the shape of the poles 14 and 16 and has minimal compression as to not arrest the pole motion early. Thus, the apparatus is characterized by low audible noise. The skirt 25b has opposed sides, one of which is interposed in the associated gap 22. These opposed sides are thinner than the other pair of opposed sides. This enables the skirts 25b to be positioned in the gaps 22 between the poles 14 and 16 while achieving optimum spacing of the gaps 22 between the poles 14 and 16 and thereby maximizing the flux flow across the gaps 22 between the poles 14 and 16. As the flat top 25a of bumper 25 is now positioned in notch 11 outside the associated gap 22 between the poles 14 and 16 and out of the way of the flux path between the juxtaposed poles 14 and 16, it is thicker in order to fit into the pole notch 11 and thus, more securely holds the skirt 25b in its position between the poles 14 and 16. The advantage of the bumper 25 with skirt 25b is that the skirt 25b covers more surface area than the simple bumper 24 as previously described, thus improving the noise attenuation.

Figure 5:
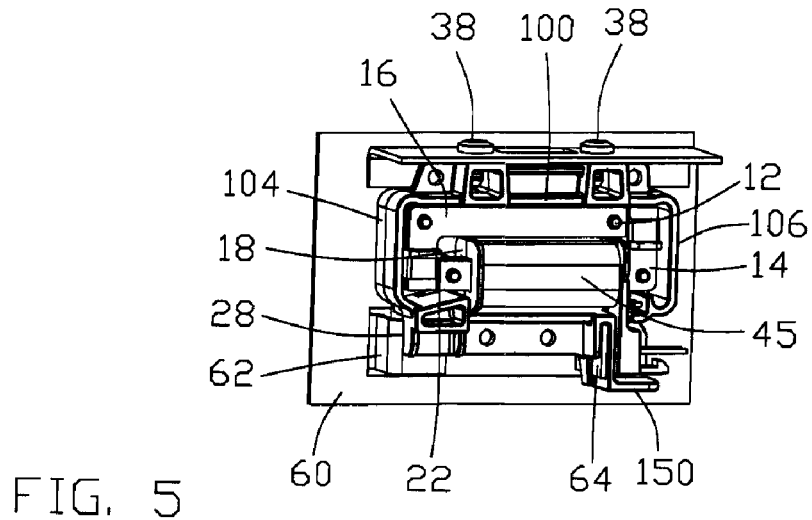
FIG. 5 is a perspective view of the novel haptic solenoid shown in FIGS. 3 and 4 mounted in combination with a touch screen.
Figure 6:
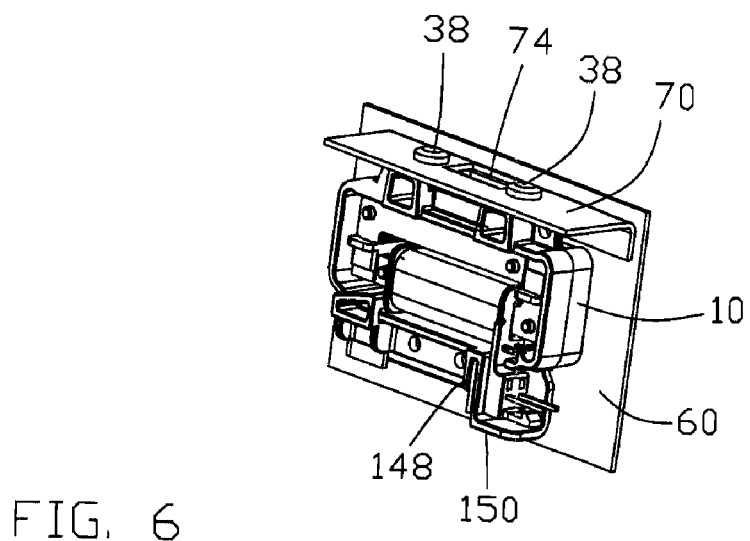
FIG. 6 is a perspective view of the novel mounted haptic solenoid in combination with a touch screen shown in FIG. 5 taken from another angle.
Figure 7:
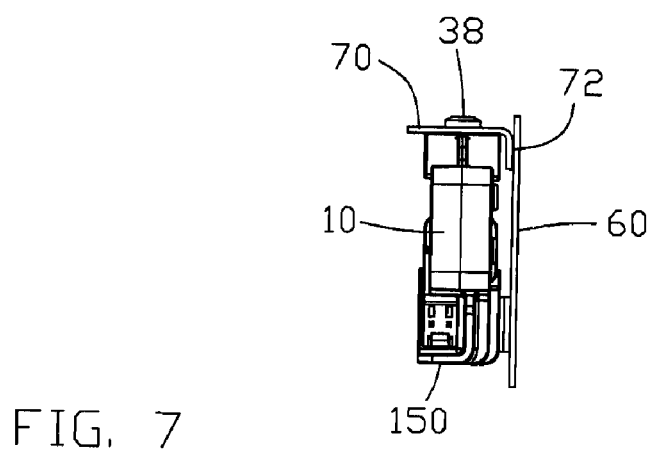
FIG. 7 is a side view of the novel mounted haptic solenoid in combination with a touch screen shown in FIG. 5.
Figure 8:
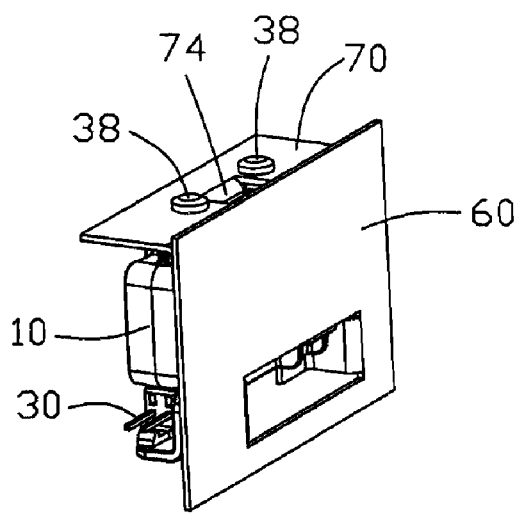
FIG. 8 is a perspective view of the novel mounted haptic solenoid in combination with a touch screen shown in FIG. 5 as seen from the back.
Figure 9:
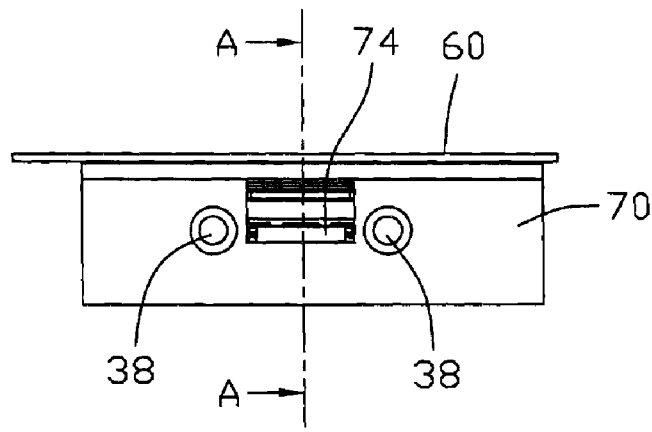
FIG. 9 is a top view of the novel mounted haptic solenoid in combination with a touch screen shown in FIG. 5.
Figure 10:
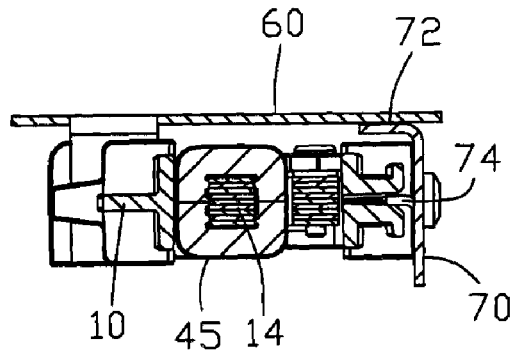
FIG. 10 is a cross-sectional view of the novel mounted haptic solenoid in combination with a touch screen shown in FIG. 5 taken along line A-A of FIG. 9.
Figure 16:
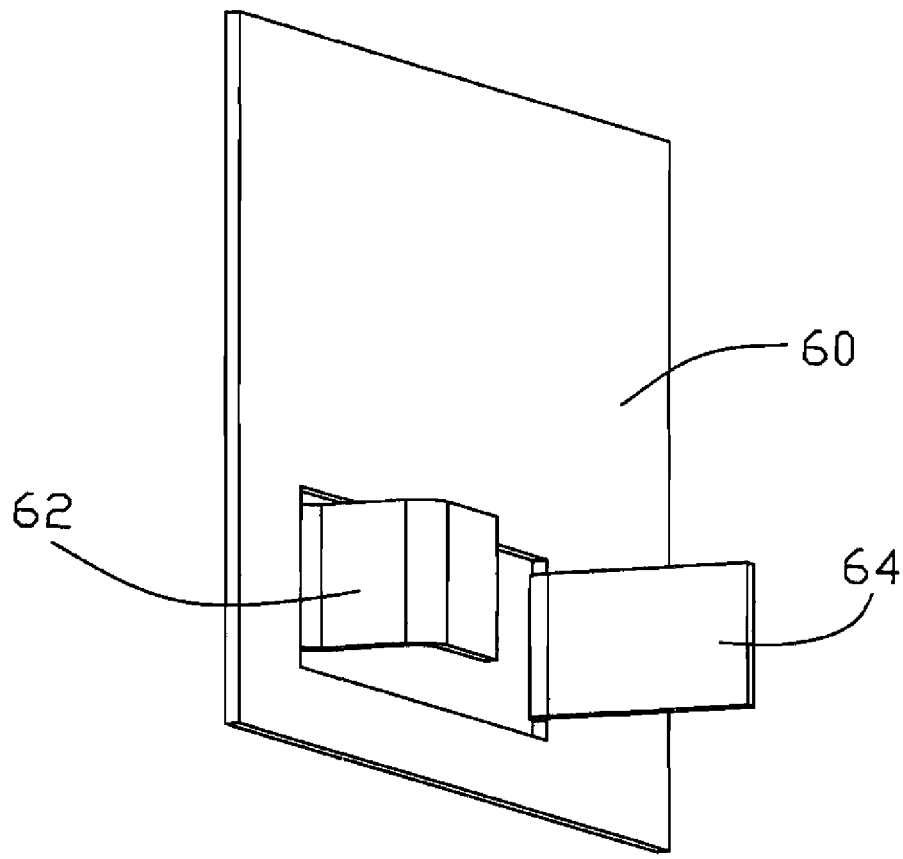
FIG. 16 is a perspective of the support plate onto which the novel haptic solenoid is mounted.

Referring to FIGS. 5 to 10, the mounting of the haptic solenoid to mounting plate 60 and a touch screen frame 70 will now be described. In FIG. 5 the haptic solenoid apparatus (that of FIGS. 3 and 4) is shown mounted to a bottom sheet 60 by means of two pushed out tabs 62 and 64, see FIG. 16. Tab 62 is received in longitudinal tapered slot 144 of frame 10 and tab 64 is received in transverse tapered slot 148 in frame 10. These mounting slots 144 and 148 extend normal to one another; both slots interact with the tabs 62 and 64 as press fits. To this end, rib or dimple 149 presses more firmly against tab 64. Sheet 60 can be part of the casing for the media electronics. A touch screen frame 70 has a bent marginal area 72 that fits between the haptic solenoid and the sheet 60 with some clearance between marginal area 72 and sheet 60 so that the screen frame 70 can move freely. The touch screen frame 70 is attached to the haptic solenoid by means of pine-tree fasteners 38 through holes 73 in the touch screen frame, as previously noted. The touch screen frame 70 has a pushed out tab 74 (see FIG. 15) that is press fitted into the longitudinal, tapered pocket or slot 26 formed in the top of the frame 10. Ribs 134 and 136 insure a firmer press fit. This is shown best by reference to FIGS. 8 to 10, which shows in detail, including a cross section through the haptic solenoid and the touch screen frame 70, the coaction. Thus, the vibrational path goes from the movable pole 16 via the frame 10 and tab 74 to the touch screen frame 70.

A third embodiment of the present invention, and the best mode for carrying out the invention as contemplated by the inventors, utilizes two bumpers 80, as shown in FIGS. 13 and 14, in place of bumpers 25. Bumper 80 is essentially like bumper 25, that is, annular, square in cross section and resilient with a flat top 82 that extends outwardly on first opposite sides and an integral depending skirt 84, which has cutouts 86 on second opposed sides created by removing a portion of the side just beneath the flat top 82 which allows for gap control during assembly. One second opposed side is located in gap 22. The skirt also has hemispherical cutouts 88 on the first opposed bottom edges 88a of the skirt 84 that assist during assembly vis-à-vis the pole flat surfaces. Thus, the cutouts 88 on the first opposed sides are displaced ninety degrees from the side cutouts 86 on the second opposed sides. Otherwise the components of the haptic solenoid are the same as in the first two embodiments.

For automotive applications and other applications where noise needs to be suppressed, it is important to use the inventive haptic solenoid with a bumper. Without a bumper, the haptic solenoid will function with a loud noise or click when it is powered. The bumper acts as a noise dampener (acoustic dampening). The objective achieved by the present invention is a design for the haptic solenoid that produces the desired acceleration without making a harsh click noise. Of the three embodiments described herein, the following outlines the characteristics of the haptic solenoid using each of the bumpers described. A durometer of 60±10 is preferred for the bumpers. The bumpers can occupy approximately 50%±10% of gaps 22.

In the first embodiment, the bumper 24 is a simple square cross section band bumper that dampens the pole click noise. Range of the acceleration with a 100 gram load attached to the top of the solenoid was 6 gs-8 gs. Due to the location of bumper 24, the acceleration is reduced. Also, the dampening and acceleration will be influenced by the bumper thickness and durometer. Other variations in simple geometry are possible and will exhibit similar characteristics.

The bumper 25 with integral a thin wall thickness depending skirt dampens the pole click noise to a lesser degree than the first embodiment, bumper 24, and is consistent in achieving acceleration of about 9-16 gs measured with a 100 gram load attached to the top of the solenoid. Using a thicker wall skirt will dampen the pole click noise more, but will reduce the acceleration. Accordingly, for this design, the dampening and acceleration are greatly influenced by the bumper wall thickness and durometer. Other variations with similar geometry are possible and will exhibit similar characteristics.

Bumper 80 with the cut-out skirt 84 dampens the pole click noise and is more consistent in achieving the minimum 8 g of acceleration measured with a 100 gram load attached to the top of the solenoid, and is the best mode for carrying out the invention. This bumper 80 configuration also enables the bumper to be positioned in a more optimum location to dampen the pole click sound as the haptic frame 10 twists during an event. As with the other configurations, the dampening and acceleration is influenced by the bumper thickness and durometer. Other variations with similar geometry are possible and will exhibit similar characteristics.

The benefit of these bumper styles over a glued bumper is the positive mechanical retention of the bumper without any adverse stiffening or loss of resiliency effect. This kind of retention method will ensure that the bumper will not move, shift or slide out of its position due to temp, humidity, vibration, thermal shock and mechanical shock.

Some key characteristics for function of the novel haptic solenoid apparatus are as follows. The base of the solenoid (lower portion of frame 10) does not move, and therefore should be rigid, and is mountable to the sheet metal case that holds the electronics of the system. The top portion of the solenoid (pole 16 and top portion of frame 10) moves and provides the spring action (spring rate of 14,000 N/m nominal±1000 N/m) to return the pole 16 back to original position during operation, and will transmit that movement to the touch screen frame 70.

As an example of a typical automotive application, optimum stationary gaps 22 between the poles could be (0.4 to 0.65±0.05 mm); the "moving pole" (or top pole 16) should travel 0.25 to 0.35±0.06 mm and not be prematurely arrested; and the bumpers should occupy approximately 40 to 60% of the gap clearances.

The solenoid can be mounted in front facing or rear facing to the mounting surface. The likely mounting surfaces (sheet 60) should be about 0.75 to 1 mm thick sheet metal to support the solenoid. 1 or 2 bumpers can be used to prevent pole impact noise during operation. The thickness and material of the bumper can be selected based on the teachings herein to give best results.

Proper winding (Ampere turns) are needed to generate the necessary flux for adequate function, and vehicle electrical wires will be connected to supply voltage and current to components of the electronics and solenoid.

Although the pole design/material described above will provide good function, variations will be evident to those of ordinary skill in the art from the teachings herein.

Although the invention has been described in terms of preferred embodiments, nevertheless changes will be evident to those of ordinary skill in the art from the teachings hereof. Such changes are deemed to fall within the purview of the claims.

What is claimed is:

1. A haptic solenoid comprising in combination a monolithic plastic frame defining a central open area, a pair of similar L-shaped poles mounted in the frame in the open central area in juxtaposition to define gaps between them, one of said poles constituting a stationary pole mounted to a longitudinally extending first portion of said frame and the other of said poles constituting a movable pole mounted to a longitudinally extending second portion of said frame, a winding mounted on the stationary pole, the second portion of said frame on which the movable pole is mounted providing flex, said second portion of said frame defining an elongated vibration transmitting slot that extends coaxially with the longitudinally extending second portion of said frame for establishing pressure fit contact with a member to be vibrated so that vibrations created by the movable pole can be transmitted via the elongated slot to the member to be vibrated, and the first portion of said frame on which the stationary pole is mounted including at least one coupling element for engagement with a supporting member that holds said first portion of said frame stationary.

2. A haptic solenoid according to claim 1 wherein the mounting of the poles is accomplished by openings in said poles and by integrally formed posts on the frame having a smaller diameter than the openings in said poles cantilevered into the central open area of the frame and the poles being heat staked in predetermined positions on said posts.

3. A haptic solenoid according to claim 1 wherein the mounting of the poles is accomplished by knurl pins that hold the poles in predetermined positions on the frame by coaction with pole mounting tab supports defined by the frame.

4. A haptic solenoid according to claim 1 further including at least one cushioning resilient bumper interposed between said poles in at least one gap.

5. A haptic solenoid according to claim 1 wherein the coupling element on said first portion of said frame defines an elongated slot.

6. A haptic solenoid according to claim 5 wherein two spaced apart coupling elements are included on said first portion of said frame with each coupling element defining an elongated slot, each for establishing pressure fit with a support member that holds said first portion of said frame stationary, with said elongated slots being angularly oriented to one another.

7. A haptic solenoid according to claim 1 further wherein the winding is on a bobbin that includes an integrated connector.

8. A haptic solenoid system comprising in combination a supporting surface, a touch screen member, a plastic frame defining a central open area and having a first vibration transmitting elongated slot and at least two mounting slots, a pair of similar L-shaped poles reverse mounted in the central open area of the frame in juxtaposition to define gaps between them, one of said poles constituting a stationary pole and the other of said poles constituting a movable pole, a winding mounted on the stationary pole, a first portion of said frame on which the movable pole is mounted providing flex, said first portion of said frame defining said vibration transmitting elongated slot, said touch screen member defining a tab that is press fitted into said vibration transmitting elongated slot of the frame so that vibrations created by the movable pole can be transmitted via the vibration transmitting elongated slot to the touch screen member, a second portion of said frame on which the stationary pole is mounted defining two coupling elements defining elongated slots for engagement with a supporting member, and a pair of support coupling tabs defined by the supporting surface for mutually coacting with the elongated slots of the coupling elements for mounting the frame to the supporting member in a stationary position.

9. The combination of claim 8 wherein the mounting of the poles is accomplished by integrally formed posts on the frame and the poles being heat staked in position.

10. The combination of claim 8 wherein the mounting of the poles is accomplished by knurl pins that hold the poles in position on the frame.

11. The combination of claim 8 further including at least one cushioning resilient bumper is interposed between said poles in at least one gap.

12. The combination of claim 8 further wherein the winding is on a bobbin that includes an integrated connector.

13. A haptic solenoid comprising in combination a monolithic plastic frame defining a central open area, a pair of similar L-shaped poles mounted in the frame in the open central area in juxtaposition to define gaps between them, one of said poles constituting a stationary pole and the other of said poles constituting a movable pole, a winding mounted on the stationary pole, a first portion of said frame on which the movable pole is mounted providing flex, said first portion of said frame extending longitudinally and defining a longitudinally extending vibration transmitting elongated slot for establishing pressure fit contact with a member so that vibrations created by the movable pole can be transmitted via the elongated slot to the member, and a second portion of said frame on which the stationary pole is mounted having at least one coupling element defining an elongated slot for engagement with a supporting member to hold the second portion of said frame stationary, and an acoustic dampener mounted in at least one gap between the poles to enable noise suppression and to maximize acceleration between the poles.

14. A haptic solenoid according to claim 13 wherein at least one of the poles is provided with a cutout adjacent the gap and the dampener is lodged in the cutout.

15. A haptic solenoid according to claim 13 wherein the dampener is a skirt bumper.

16. A haptic solenoid according to claim 15 wherein the bumper has at least one cutout in the region where the bumper skirt is interposed in the gap.

17. A haptic solenoid according to claim 13 wherein said poles are mounted in said central open area on elements mounted on portions of the frame.

18. A haptic solenoid according to claim 13 wherein the frame is oriented vertically and the upper portion of the frame constitutes the first portion of the frame and the lower portion of the frame constitutes the second portion of the frame, and wherein the vibration transmitting elongated slot is in the upper portion of the frame and the lower portion of the frame includes two spaced coupling elements which define two elongated spaced slots angularly oriented to one another for mounting the solenoid on a support member for holding the lower portion of the frame stationary.

* * * * *